Dec. 28, 1948. B. F. McNAMEE 2,457,165
ELECTRICAL BRIDGE
Filed May 20, 1944 3 Sheets-Sheet 1

PRIOR ART FORM OF BRIDGE CIRCUIT INCORPORATING STRAIN GAUGE

INVENTOR
Bernard F. McNamee
BY
Christie & Angus
ATTORNEYS

Dec. 28, 1948.   B. F. McNAMEE   2,457,165
ELECTRICAL BRIDGE
Filed May 20, 1944   3 Sheets-Sheet 2
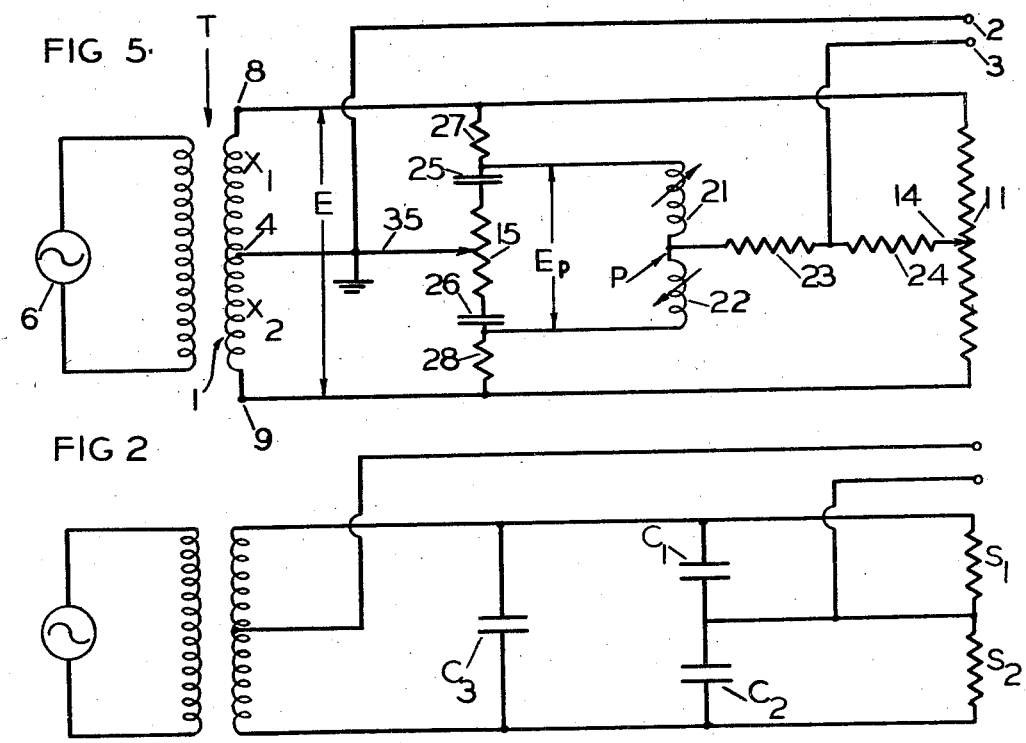
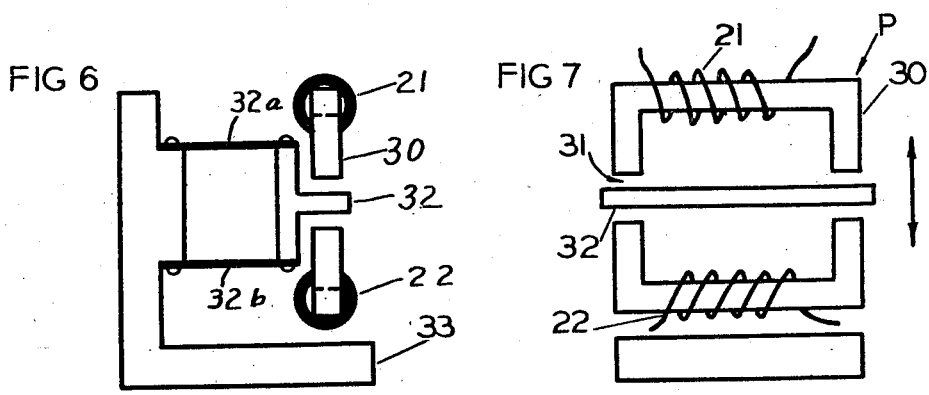
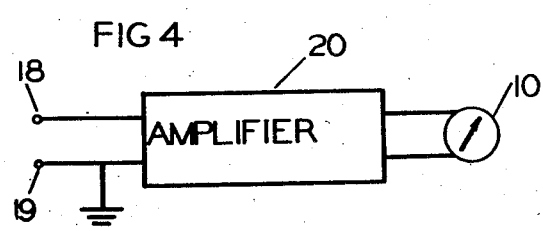
INVENTOR
Bernard F. McNamee
BY
Christie & Angus
ATTORNEYS Dec. 28, 1948.　　　B. F. McNAMEE　　　2,457,165
ELECTRICAL BRIDGE
Filed May 20, 1944　　　3 Sheets-Sheet 3
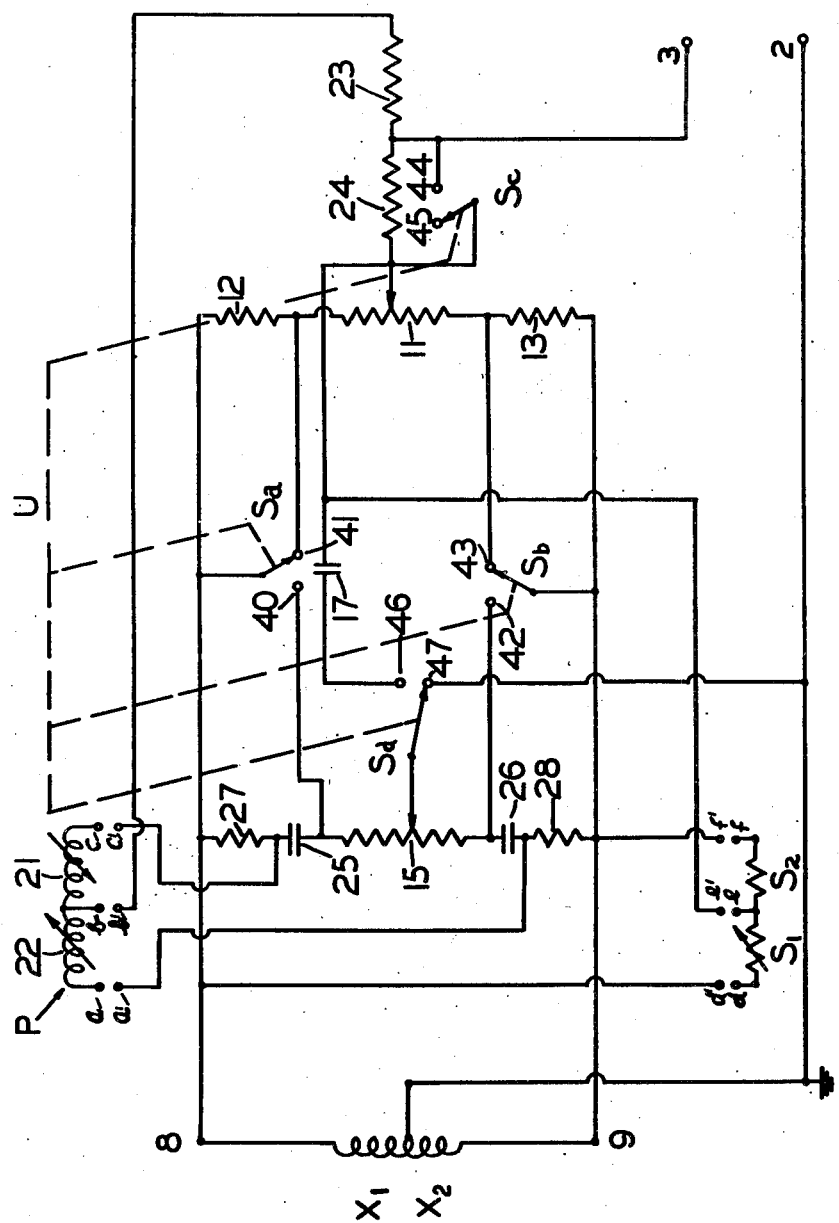
INVENTOR.
Bernard F. McNamee
BY
ATTORNEYS Patented Dec. 28, 1948

2,457,165

UNITED STATES PATENT OFFICE 2,457,165

ELECTRICAL BRIDGE

Bernard F. McNamee, Altadena, Calif., assignor to Consolidated Engineering Corporation, Pasadena, Calif., a corporation of California Application May 20, 1944, Serial No. 536,623

5 Claims. (Cl. 323—75)

This invention relates to electrical measurements and more particularly to electrical systems adapted to measure the deflections and vibrations in structural members.

The object of the invention is to provide a system for measuring a static deflection or displacement of a structural member or an amplitude of vibration if the member be vibrating.

It is known that strains and vibrations in a member may be determined by attaching to the member a resistance or impedance device, the resistance or impedance of which is varied by the variations in the member. Strain gauges have commonly been used for this purpose and vibration type pickups having a variable impedance have also been used. The strain gauge or pickup is connected in a suitable bridge circuit which is supplied by a source of alternating current, and which is adjusted to balance. The variation produced in the resistance or impedance of the strain gauge or pickup unbalances the bridge, and the amount of the unbalance, received on an indicating device, is a measure of the strain or vibration.

I have observed that the balance of such bridge circuits has frequently been imperfect, owing to the inability rapidly to obtain an exact phase balance in addition to the amplitude balance. The phase unbalances may be occasioned for example, by distributed capacity unbalances in the cables or by unbalances in the pickup devices, or both. When there is a phase unbalance, the indicator is apt to give an erroneous indication of amplitude balance. If, after the original balanced condition is obtained in the bridge, there is a change in the resistance of one arm, but not in the reactance, it is desirable to be able to rebalance by readjusting one control only. I am able to accomplish this in accordance with a feature of my invention.

In accordance with my invention, I provide a bridge circuit in which phase balance as well as amplitude balance may be made rapidly, thereby increasing the accuracy of the indicator readings. Moreover my system is adapted to the use of either a strain gauge or a pickup, as desired.

A feature resides in a switching arrangement whereby either a strain gauge or a variable impedance pickup may be connected in one of the bridge arms, using the same two impedance elements as balance controls in either case. This aids in making an instrument of small size and low cost.

The foregoing and other features will become more apparent from the following detailed description, and the accompanying drawing of which:

Fig. 2 shows the distribution of extraneous capacities in the circuit of Fig. 1;

Fig. 4 shows an indicator arrangement for connection to the output of the bridges of my invention;

Fig. 5 shows another bridge circuit according to my invention;

Fig. 6 shows an electromagnetic type of pickup device which may be used in the system of Fig. 5;

Fig. 7 is a side view of the pickup shown in Fig. 6;

Fig. 9 shows a switching system in accordance with my invention for switching from the circuit of Fig. 3 to that of Fig. 5.

Figure 1:
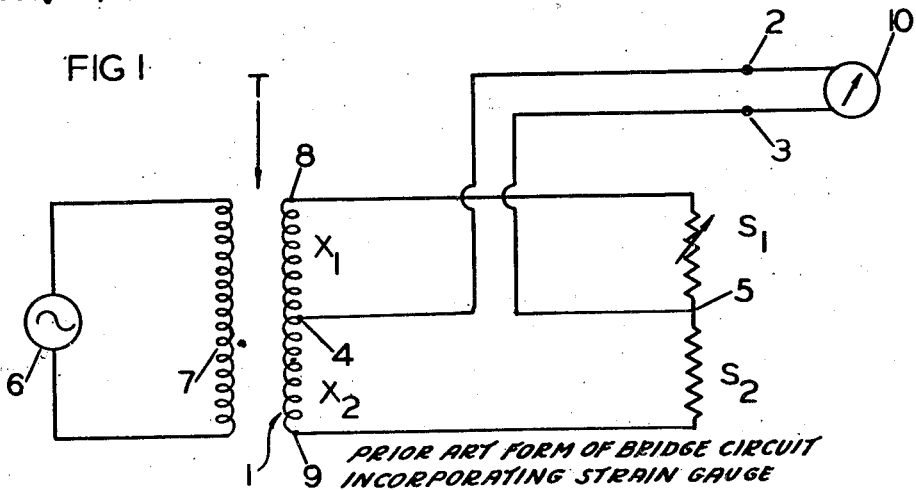
Fig. 1 shows a bridge circuit incorporating a strain gauge in accordance with prior known arrangements.

In Fig. 1 there is shown a well known type of bridge circuit incorporating a strain gauge $S_1$ in one of its arms. The strain gauge may be of any well known variable resistance type adapted to be attached to the member of which the strain is to be measured. The strain gauge may, for example, comprise a wire adapted to be fastened at its ends, or connected to the member being measured. In such a gauge the resistance changes when the wire is stretched and the change of resistance gives an indication of the strain. The bridge comprises the secondary winding 1 of transformer T, the strain gauge $S_1$ and another resistance $S_2$ all in series. The output circuit is taken at terminals 2 and 3 connected respectively to the mid-point 4 of winding 1 and to the point 5 between the two resistances $S_1$ and $S_2$. A meter or indicator 10, responsive to alternating current is shown connected to the output terminals to indicate any output from the bridge. The resistance $S_2$ may be an ordinary fixed resistance, but very commonly it is another resistance type strain gauge similar to $S_1$ which is placed near $S_1$ but unattached to the member being measured so that it is not subjected to strain. It is however, subjected to the same temperatures as $S_1$ and accordingly varies with temperature in the same way, thereby eliminating temperature errors.

An alternating voltage source 6 which may be a constant frequency oscillator, oscillating for example, at 1000 cycles per second may be attached to the primary winding 7 of transformer T.

Ordinarily, point 4 is the mid-point of secondary winding 1, so that the impedance $X_1$ between points 4 and 8 is the same as the impedance $X_2$ between points 4 and 9. When the resistance of $S_1$ is equal to the resistance of $S_2$, the bridge balances and no deflection is measured at the indicating meter 10. When, however, the resistance of $S_1$ is varied due to a strain in the member being measured, the bridge is unbalanced and a resulting voltage exists across the terminals 2 and 3, creating a corresponding indication on the indicating meter 10. The meter reading shows the amount of the strain.

With the arrangement of Fig. 1, there are frequently errors in the readings of the indicator particularly where high precision readings are required, due to the effect of distributed capacities between the leads to the resistors $S_1$ and $S_2$. These distributed capacities create phase unbalances which tend to produce an indicated deflection which is not dependent alone on the variation of resistance in the strain gauge. The distributed capacities are indicated as capacities $C_1$, $C_2$ and $C_3$ in Fig. 2. The capacity $C_3$ across the entire bridge will not produce any unbalance, but the capacities $C_1$ and $C_2$, being in parallel respectively with the resistors $S_1$ and $S_2$ of the bridge, can produce unbalances when they are unequal.

Figure 3:
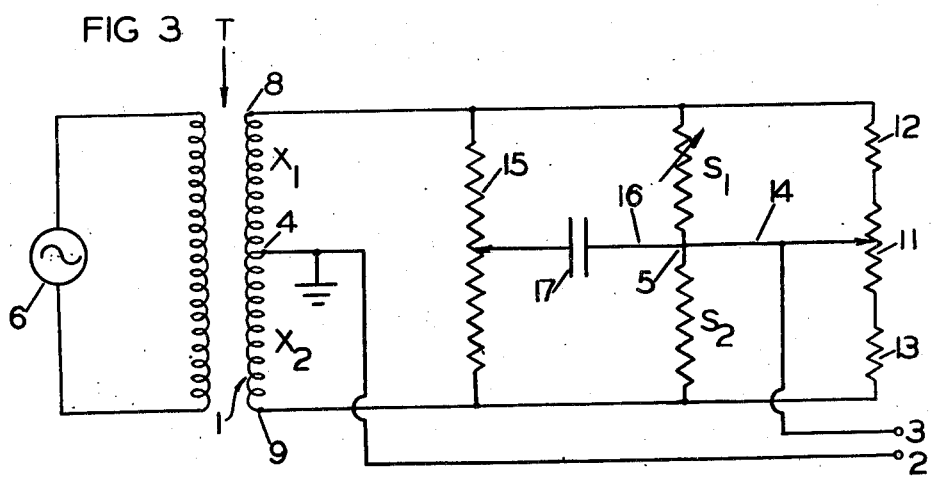
Fig. 3 shows a bridge circuit in accordance with my invention.

In Fig. 3 I show a bridge circuit in which correction is provided for the capacity unbalances. The bridge comprises the inductive impedances $X_1$ and $X_2$ and the resistors $S_1$ and $S_2$ as in Fig. 1. In addition there are provided two balances for the bridge, one an amplitude balance and the other a phase balance. The amplitude balance is provided by the adjustable potentiometer 11 connected in series between resistors 12 and 13. The three series connected resistors 12, 11 and 13 are connected across the bridge points 8 and 9 so that they are in parallel with the series-connected resistors $S_1$ and $S_2$. The phase balance is provided by the adjustable potentiometer 15 also connected across the bridge points 8 and 9. A connection 14 connects the bridge point 5 to the potentiometer 11 and a connection 16 having a small capacitor 17 in it connects the bridge point 5 to the potentiometer 15. As the amount of capacity unbalance in the cables is seldom more than .005 mf., the capacity of 17 can usually be as small as .005 mf.

The output terminals 2 and 3 are taken from bridge points 4 and 5 as in the case of Fig. 1, points 4 and 5 being conjugate to points 8 and 9. These output terminals will ordinarily connect to an electronic amplifier, for example, to the terminals 18 and 19 respectively at the input of amplifier 20 in Fig. 4. The amplified carrier frequency may then be used to operate the indicating device 10 in any well known manner. For example, the amplified current may be rectified and made to operate a galvanometer; or if it is desired, the output may be used to operate a recording voltmeter. In any case the indicating or recording instrument is indicated by the numeral 10.

In operation, the bridge will ordinarily be initially brought to a balance. This may be done by adjustment of the adjustable tap on potentiometer 11 to produce a minimum indicator reading. Then the balance may be further refined by means of the phase balance at potentiometer 15. Movement of the adjustable arm of this potentiometer serves to put the condenser 17 in parallel with one of the stray capacities in the lines leading to the resistors $S_1$ and $S_2$. For example, if the stray capacitance represented by $C_1$ be greater than that represented by $C_2$ in Fig. 2, the arm of potentiometer 15 will be moved downward, which has the effect of putting condenser 17 across $C_2$ to add to the capacity of $C_2$, so that it will balance $C_1$. In this way, the bridge may be brought to zero balance in spite of uneven stray capacities. Then when the resistance of the strain gauge $S_1$ varies due to strain of the member to which it is fastened, the resulting indication on indicator 10 due to the unbalance of the bridge gives a true indication of the amount of strain and is free from an error due to capacity unbalance.

The two balances of this bridge are substantially independent of each other; that is, each may be operated to its individual balance without affecting the other.

The values of the impedance for the bridge are not critical although the resistances in the potentiometer arms should preferably be made considerably greater than the resistance bridge arms $S_1$ and $S_2$ so that the contact resistance of the potentiometer will not produce errors. Values for the elements which have been found suitable are as follows:

| | | |
|---|---|---|
| $S_1$ | ohms | 100 |
| $S_2$ | do | 100 |
| Resistor 11 | do | 1000 |
| Resistor 12 | do | 1700 |
| Resistor 13 | do | 1700 |
| Resistor 15 | do | 3000 |
| Capacitor 17 | mf | .005 |
| Oscillator 6 | cycles per second | 1000 |

In Fig. 5 I show a variation of the bridge circuit in which there is used an electro-magnetic pickup P, instead of the strain gauge $S_1$ and resistor $S_2$ of Fig. 3. The bridge of Fig. 5 is adapted to measure amplitudes of vibration. Pickups such as P adapted for doing this are well known. Such a pickup is illustrated in Figs. 6 and 7. It comprises a magnetic core 30 having two separated U-shaped members. The two pairs of poles are separated by air gaps 31 and 31a respectively. There is wound around one core member a winding 21 and around the other core member another winding 22. The two windings are connected in series and in opposite directions. In the air gap there is placed a thin armature 32 which may be of a magnetic material and adapted to vary the reluctance of the magnetic pickup when it is moved. The core 30 is placed on a stand 33, which is adapted to be placed on the member being measured. A leg of the stand supports the armature 32 by means of a pair of flat spring members 32a and 32b; one end of each spring being fastened to the stand and the other end to the armature. When the member vibrates the core vibrates with it, but the armature 32, due to its inertia, and the flexibility of the springs, tends to remain still, thereby producing relative movement between the armature and the core. Relative to the core the armature moves in a vertical direction with reference to Fig. 6. This produces changes of impedance in the respective coils 21 and 22, in accordance with the vibrations, and when the impedance of one is increasing, the impedance of the other is correspondingly decreasing, thereby emphasizing the variations of impedance.

In Fig. 5 the coils 21 and 22 are placed in two adjacent arms of the bridge and in series with resistors 27 and 28, respectively, which have resistances much less than the impedances of the coils 21 and 22. The other two arms of the bridge comprise the inductances $L_1$ and $L_2$ as shown in Fig. 3. Potentiometer 11 is connected across the bridge points 8 and 9 as in Fig. 3, and the amplitude balance is obtained by adjustment at the potentiometer of the movable contact from lead 14 which in this case has in series in it the resistors 23 and 24. The output terminal 9 is connected between these two resistors. To avoid loss of sensitivity, the sum of resistors 23 and 24 should be much greater than the impedances of coils 21 and 22.

To provide phase balance there is connected across the pickup coils 21 and 22 a series arrangement of capacitors 25 and 26 with potentiometer 15 between them. The balance is obtained by adjustment of the movable contact from a grounded connection 35 which is connected between the mid-point 4 of secondary coil 1 and the potentiometer 15.

This arrangement provides compensation for unbalance in the ratio of reactance to resistance in coils 21 and 22, as well as for unbalance of the inter-lead capacities. The way in which phase balance is obtained on potentiometer 15 is shown by the vector diagram in Fig. 8. The voltage across terminals 8 and 9 of the bridge is represented by the vector E and the voltage across the pickup coils by the vector $E_p$. As the pickup impedance is high the main part of the current through resistors 27 and 28 is the current through condensers 25 and 26. Assume now that the adjustable contact on potentiometer 15 is brought to the end of the potentiometer adjacent condenser 25. When the current through condenser 25 to ground is almost purely reactive because the resistance of 27 is small compared to the capacitive reactance of 25; and the voltage $E_{27}$ across resistor 27 leads the impressed voltage E by almost 90°. The phase of the current through resistor 28 however, is determined by the entire potentiometer 15 as well as the condenser 26. As the resistance of 15 is higher than the reactance of 26, the voltage $E_{28}$ across 28 leads the generator voltage by only a small angle.

Figure 8:
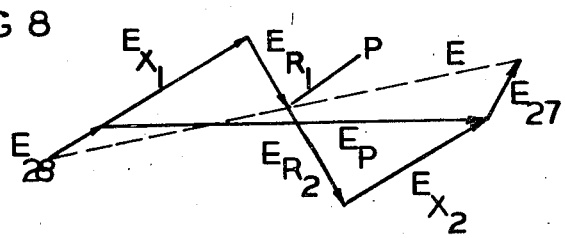
Fig. 8 shows a vector diagram of the voltages in the system of Fig. 5.

The voltages across the reactance and the resistance of pickup coil 21 are designated respectively by $E_{x1}$ and $E_{r1}$, those being 90° out of phase with each other are as shown in Fig. 8. The voltages across the reactance and resistance of coil 22 are designated $E_{x2}$ and $E_{r2}$ respectively. The vector sum of the four voltages $E_{x1}$, $E_{r1}$, $E_{x2}$ and $E_{r2}$ add up to $E_p$, the voltage across the pickup. Proper balance requires that point $p$ lie on the vector E; and this is done by the adjustment of potentiometer 15, which rotates vectors $E_{27}$ and $E_{28}$ until point $p$ does lie on vector E.

If point $p$ fails to divide vector E in half, the point can be moved along vector E by adjustment of the amplitude balance on potentiometer 11. There is only a slight amount of interlock between the amplitude and phase adjustments, that is, adjusting one way tends to unbalance the other a little. But by operating the two balances almost together a good balance can quickly be obtained.

Values for the elements found suitable for this bridge are as follows:

| | |
|---|---|
| Oscillator 6 | 1000 cycles per second |
| Impedance of coils 21 and 22 | Less than 10,000 ohms each at 1000 C. P. S. |
| Resistor 15 | 3000 ohms |
| Resistor 11 | 1000 ohms |
| Resistor 23 | 5600 ohms |
| Resistor 24 | 100,000 ohms |
| Capacitors 25 and 26 | 0.1 mf. each |
| Resistors 27 and 28 | 100 ohms each |
| Impedance of transformer secondary | 200 ohms at 1000 C. P. S. |

Fig. 9 shows a switching system for switching from the bridge circuit of Fig. 3 to that of Fig. 5 and vice versa. All of the elements shown in both Figs. 3 and 5 are included in Fig. 9, wherein like numerals designate like parts. Either the strain gauges $S_1$ and $S_2$, or the electromagnetic pickup P may be connected into the system, but not both at the same time. When the inductive pickup P is connected, its three terminals $a$, $b$ and $c$ are connected respectively to terminals $a'$, $b'$ and $c'$ of the Fig. 9 circuit; and when the strain gauge is connected to the system, its three terminals $d$, $e$ and $f$ are connected to their respective terminals $d'$, $e'$ and $f'$. For switching from the strain gauge circuit to the pickup circuit and vice versa, there are provided the four switches $S_a$, $S_b$, $S_c$ and $S_d$, which may be operated by a single control indicated by the dotted lines U. When the pickup P is connected to the system the four switches should be thrown to their respective switch points 41, 43, 45, and 47 as shown. When on the other hand, the strain gauge is connected and the pickup disconnected, the switches should be thrown to their respective switch points 40, 42, 44 and 46.

It will be recognized that by my invention I have provided an alternating current bridge circuit in which the output indicator accurately measures a displacement or vibration of a member, and avoids error due to phase unbalances. Moreover the system may be readily switched for operation either with a strain gauge or a magnetic pickup.

I have also provided a bridge circuit in which the phase and amplitude controls are independent of each other for all practical purposes when used with strain gauges, and more independent than previous bridges when used with inductive pickup devices, a feature which makes for rapid balancing.

In the case of strain gauges, it frequently happens that some time after the bridge has been balanced, the unstrained resistance of one gauge drifts to a new value, but the capacities in the bridge remain constant. This unbalances the bridge both in amplitude and phase, and in previous bridges it was necessary to use both controls to rebalance it. In my invention, it is only necessary to readjust the amplitude control. This feature is particularly convenient in testing airplanes in flight.

I claim:

1. In an alternating current bridge having four impedance arms, a first pair of opposite bridge points across which an alternating voltage is impressed and a conjugate pair of opposite bridge points across which an output voltage is taken, a branch comprising a potentiometer having an adjustable tap, said potentiometer being connected between the first pair of points, a connection from the adjustable tap on said potentiometer to one of said output terminals, a pair of condensers, one on each side of and in series with said potentiometer, another branch comprising a potentiometer having an adjustable tap, said last-mentioned potentiometer being connected across the first pair of terminals, and a connection from the tap of the last mentioned potentiometer to the other of said output terminals and to one of the conjugate pair of bridge points.

2. In an alternating current bridge having four impedance arms comprising four inductive impedances, the first two of which are fixed and the last two of which are variable, a first pair of opposite bridge points across the two fixed arms and across which an alternating voltage is impressed, and a conjugate pair of opposite bridge points across which an output voltage is taken, a branch connected across the first pair of points comprising in series in the order named, a resistance, a condenser, a potentiometer, a condenser, and a resistance, said potentiometer having a tap and a connection from the tap to one of the conjugate points connected between the fixed impedances, one side of the variable inductances being connected to the point between one of said resistances and condensers and the other side of the variable inductances being connected to the point between the other of said resistances and condensers, a second potentiometer connected across said first pair of bridge points and a connection from the tap of the last mentioned potentiometer to the point between the variable impedances, a pair of resistances in series in the last mentioned connection and a connection from the point between the last mentioned resistances to the other output terminal.

3. A system for measuring either static or vibrational strains which comprises a pair of input bridge points and a conjugate pair of output bridge points, a pair of impedance arms connected between said input bridge points, a series circuit between said input bridge points comprising in series in the order named, a resistor, a condenser, a potentiometer, a second condenser and a second resistor, a pair of resistance elements one of which is adapted to undergo a variation of its resistance value in response to strain arranged in series and connected between said input terminals, an inductive pickup having two coils connected in series from the point between the first-mentioned resistance element and first condenser and the point between the second condenser and second resistance element, another circuit connected between said input terminals comprising in series in the order named, a third resistance element, a second potentiometer and a fourth resistance element, a connection from one of said output terminals to the tap of the first-mentioned potentiometer, a connection from the other of said output terminals through a fifth resistance element to the tap of the second potentiometer, a connection from said other output terminal through a resistance element to the point between the two pickup coils, a first switch having an arm connected to one of the input terminals and adapted to short circuit either the third resistance element or the series-arranged first resistor and first condenser, a second switch connected to the other input terminal and adapted to short circuit either the fourth resistance element or the series-arranged second resistance element and second condenser, a third switch connected to the tap on the first potentiometer and adapted to connect said tap either to the first output terminal or to the tap of the second potentiometer through a third condenser, a fourth switch having its arm connected to the tap of the second potentiometer and adapted to connect with the other output terminal.

4. Apparatus according to claim 3 in which all of said switches are connected with a single control device for operating them in unison.

5. An alternating current bridge having a first pair of terminals across which an alternating voltage is impressed and a conjugate pair of terminals across which an output voltage is taken, a phase unbalance and also an amplitude unbalance between the first pair of terminals, means of balancing said phase unbalance comprising a potentiometer having an adjustable tap, said potentiometer being connected between said first pair of terminals and a connection including a balancing reactance between one of said output terminals and the tap on said potentiometer, and means for balancing said amplitude unbalance comprising a second potentiometer having an adjustable tap, said second potentiometer being connected between said first pair of terminals and including a connection between one of said output terminals and the tap on the second potentiometer.

BERNARD F. McNAMEE.

REFERENCES CITED

The following references are of record in the file of this patent:

Electrical Engineering, Mar. 1940 pp. 108 to 111.